United States Patent
Huang et al.

(10) Patent No.: US 11,824,491 B2
(45) Date of Patent: Nov. 21, 2023

(54) SUPPORT STRUCTURE FOR A SOLAR PANEL

(71) Applicants: Chao Yao Huang, Tainan (TW); Chia Hsin Chang, Tainan (TW)

(72) Inventors: Chao Yao Huang, Tainan (TW); Chia Hsin Chang, Tainan (TW)

(*) Notice: Subject to any disclaimer, the term of this patent is extended or adjusted under 35 U.S.C. 154(b) by 0 days.

(21) Appl. No.: 17/699,571

(22) Filed: Mar. 21, 2022

(65) Prior Publication Data

US 2022/0337187 A1    Oct. 20, 2022

(30) Foreign Application Priority Data

Apr. 14, 2021   (TW) .................................. 110204050

(51) Int. Cl.
    *H02S 30/10* (2014.01)
(52) U.S. Cl.
    CPC .................................... *H02S 30/10* (2014.12)
(58) Field of Classification Search
    None
    See application file for complete search history.

(56) References Cited

U.S. PATENT DOCUMENTS

| | | | | |
|---|---|---|---|---|
| 5,240,089 | A * | 8/1993 | Spera | E04G 7/26 182/186.7 |
| 8,480,330 | B2 * | 7/2013 | Urban | F24S 25/61 403/387 |
| 9,660,570 | B2 * | 5/2017 | Stephan | F16B 5/0028 |
| 10,727,780 | B2 * | 7/2020 | Kobayashi | F16B 2/065 |
| 2015/0168021 | A1 * | 6/2015 | Wentworth | F24S 25/70 52/173.3 |
| 2020/0052643 | A1 * | 2/2020 | Ballentine | F16M 11/10 |
| 2021/0194410 | A1 * | 6/2021 | Yang | H02S 20/23 |
| 2021/0194418 | A1 * | 6/2021 | Ballentine | F24S 30/42 |

\* cited by examiner

*Primary Examiner* — Steven M Marsh
(74) *Attorney, Agent, or Firm* — Rosenberg, Klein & Lee

(57) ABSTRACT

A support structure for a solar panel includes a beam disposed above a post. The beam includes a first side recessed inwards to form a first rectilinear groove extending in a longitudinal direction of the beam. The first rectilinear groove includes a groove opening having two opposite edges each of which inclines downwards to form a slant face connected to the first side. A spacing between two opposite inclined groove walls of the first rectilinear groove gradually decreases towards the groove opening. A U-shaped saddle is disposed between the post and the beam and straddles a top portion of the post. Two sides of the saddle respectively abut two outer faces of the post and are secured to the post. A top portion of the saddle is secured to the beam by a fastener unit.

1 Claim, 6 Drawing Sheets

SUPPORT STRUCTURE FOR A SOLAR PANEL

BACKGROUND OF THE INVENTION

The present invention relates to an assembly for a solar panel and, more particularly, to a support structure for a solar panel.

A solar panel is a device that converts the sunlight into electrical energy by photovoltaic effect. The power generating procedure is clean and environmentally friendly without generating greenhouse gases, such as carbon dioxide, which is a valued way of generating energy. A solar panel array, disposed on a wide land or a roof, is often supported and fixed by a support structure. The support structure is critical to installation of the solar panels and the stability of power generation. Particularly, in a spacious environment, the support structure must be strong enough to withstand strong winds.

Generally, hollow rectangular prims are used as beams and are spaced from each other. A fastener unit is used to couple to the solar panel to the hollow rectangular prisms, such that the hollow rectangular prisms together support the solar panel.

However, the structural strength of the hollow rectangular prisms is weak, such that an upward lifting force tends to be exerted on a bottom of the solar panel. Since the solar panel and the hollow rectangular prims are connected by the fastener unit, the lifting force will generate a stretching force on the hollow rectangular prisms, such that the hollow rectangular prisms are apt to deform or break once the stretching force exceeds the load capacity. Thus, improvement to the support structure is desired.

BRIEF SUMMARY OF THE INVENTION

In view of the problems of the prior art, a solution is desired and generally relates to a support structure for a solar panel. The support structure comprises a post and a beam disposed above the post. The beam includes a first side recessed inwards to form a first rectilinear groove extending in a longitudinal direction of the beam. The first rectilinear groove includes a groove opening having two opposite edges. Each of the two opposite edges inclines downwards to form a slant face connected to the first side. The first rectilinear groove includes two opposite groove walls which are inclined. A spacing between the two opposite groove walls gradually decreases towards the groove opening of the first rectilinear groove. A saddle is disposed between the post and the beam and straddles a top portion of the post. The saddle includes inverted U-shaped cross sections. Two sides of the saddle respectively abut two outer faces of the post and are secured to the post. A top portion of the saddle is secured to the beam by a fastener unit. The fastener unit includes a bolt having a head received in the first rectilinear groove and restrained by the two opposite edges of the groove opening of the first rectilinear groove. A nut is disposed outside of the groove opening of the first rectilinear groove and is coupled with the bolt.

In an example, the beam further includes a second side opposite to the first side. The second side is recessed inwards to form a second rectilinear groove extending in the longitudinal direction of the beam. The second rectilinear groove includes a groove opening having two opposite edges. Each of the two opposite edges inclines downwards to form a slant face connected to the second side. The second rectilinear groove includes two opposite groove walls which are inclined. A spacing between the two opposite groove walls gradually decreases towards the groove opening of the second rectilinear groove.

According to the present invention, with the saddle providing an intermediate interconnection between the post and the beam, the beam can be disposed above the post without causing lateral stretching of the post. Furthermore, the saddle covers two sides of the post, such that the weight withstood by the beam can be distributed to different portions of the beam, avoiding sudden local breakage. Particularly, when subject to outdoor sudden strong wind, problems including breakage, falling, etc., can be effectively avoided by the anti-stretch effect of the beam, which is more suitable for supporting outdoor solar panels. The slant faces and the two opposite groove walls are inclined to provide the beam with a better anti-stretch effect and a high tensile strength, thereby overcoming the drawbacks of deformation and breakage due to insufficient tensile strength.

The present invention will become clearer in light of the following detailed description of illustrative embodiments of this invention described in connection with the drawings.

DETAILED DESCRIPTION OF THE INVENTION

Figure 1:
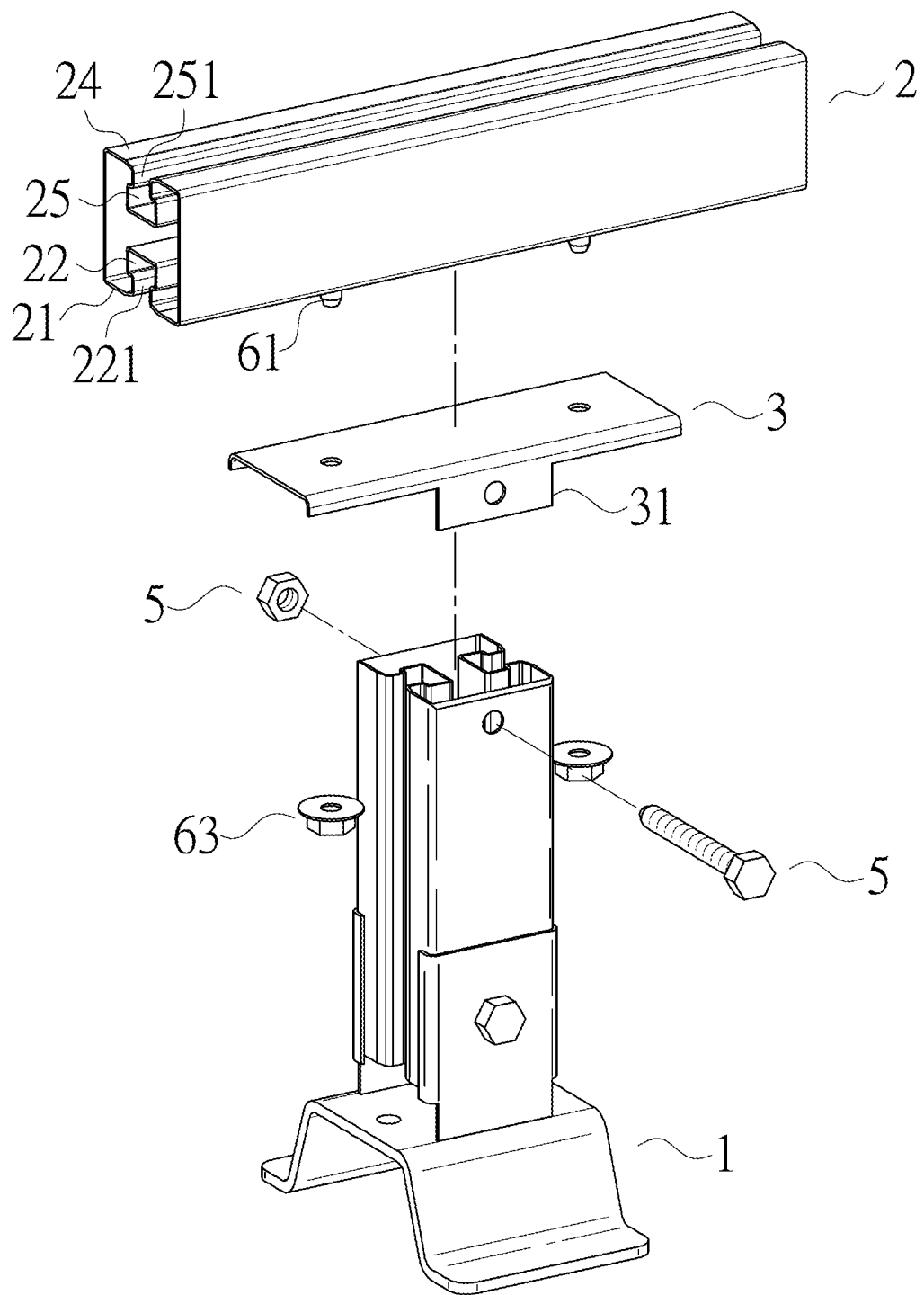
FIG. 1 is an exploded, perspective view of a support structure for a solar panel of an embodiment according to the present invention.

With reference to FIGS. 1-5, a support structure for a solar panel of an embodiment according to the present invention comprises post 1 and a beam 2 disposed above the post 1. The beam 2 includes a first side 21 and a second side 24 opposite to the first side 21. The first side 21 is recessed inwards to form a first rectilinear groove 22 extending in a longitudinal direction of the beam 2. The first rectilinear groove 22 includes a groove opening 221 having two opposite edges. Each of the two opposite edges inclines downwards to form a slant face 23 connected to the first side 22. The first rectilinear groove 22 includes two opposite groove walls 222 which are inclined. A spacing between the two opposite groove walls 222 gradually decreases towards the groove opening 221 of the first rectilinear groove 22. The slant faces 23 and the two opposite groove walls 222 are inclined to provide the beam 2 with a better anti-stretch effect and a high tensile strength, thereby overcoming the drawbacks of deformation and breakage due to insufficient tensile strength.

A saddle 3 is disposed between the post 1 and the beam 2 and straddles a top portion of the post 1. The saddle 3 includes inverted U-shaped cross sections. Two sides of the saddle 3 respectively abut two outer faces of the post 1 and are secured to the post 1 by a fastener unit 5. A top portion of the saddle 3 is secured to the beam 2 by a fastener unit 6. With the saddle 3 providing an intermediate interconnection between the post 1 and the beam 2, the beam 2 can be disposed above the post 1 without causing lateral stretching of the post 1. Furthermore, the saddle 3 covers two sides of the post 1, such that the weight withstood by the beam 2 can be distributed to different portions of the beam 2, avoiding sudden local breakage. Particularly, when subject to outdoor sudden strong wind, problems including breakage, falling, etc., can be effectively avoided by the anti-stretch effect of the beam 2, which is more suitable for supporting outdoor solar panels.

Figure 2:
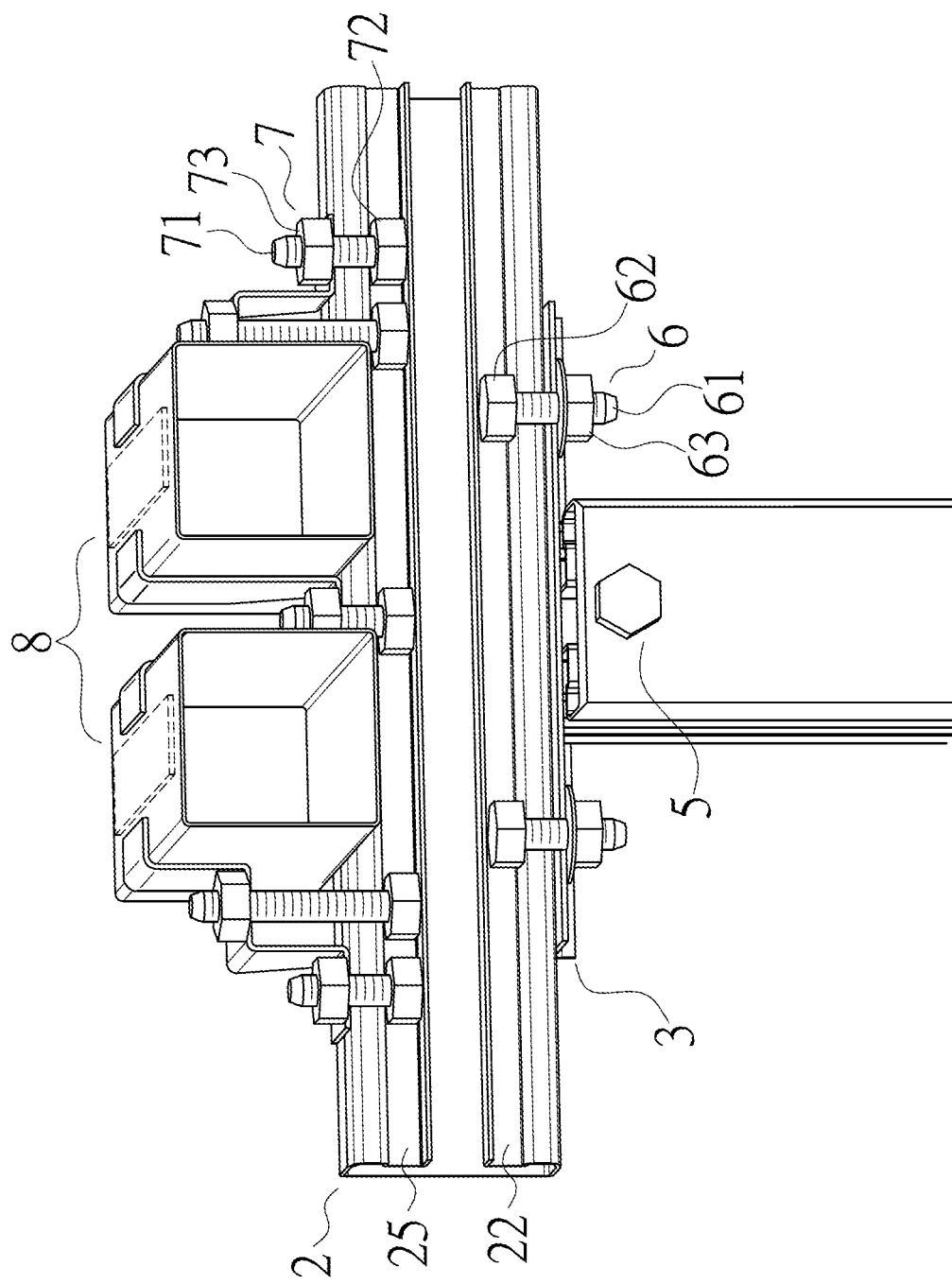
FIG. 2 is a perspective view, partly cut-away, illustrating a portion of the support structure of the embodiment according to the present invention and a connecting mechanism on which a solar panel can be disposed.
Figure 6:
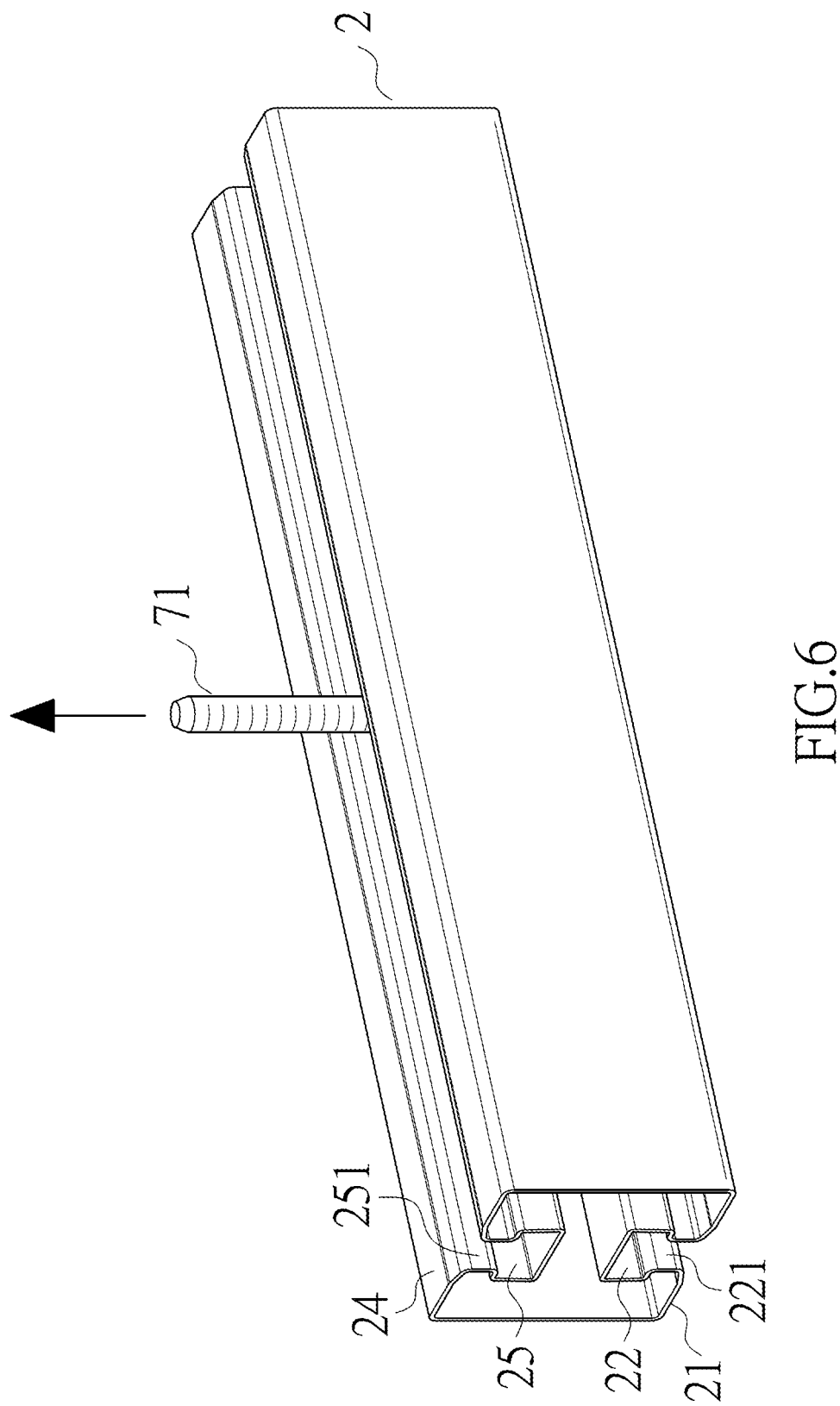
FIG. 6 is a perspective view of the beam with a bolt disposed in a rectilinear groove.

With reference to FIGS. 2 and 6, in a preferred embodiment according to the present invention, the top portion of the saddle 3 and the beam 2 are secured together by the fastener unit 6. The fastener unit 6 includes a bolt 61 having a head 62 received in the first rectilinear groove 22 and restrained by the two opposite edges of the groove opening 221 of the first rectilinear groove 22. A nut 63 is disposed outside of the groove opening 221 of the first rectilinear groove 22 and is coupled with the bolt 61, increasing the coupling strength.

Figure 3:
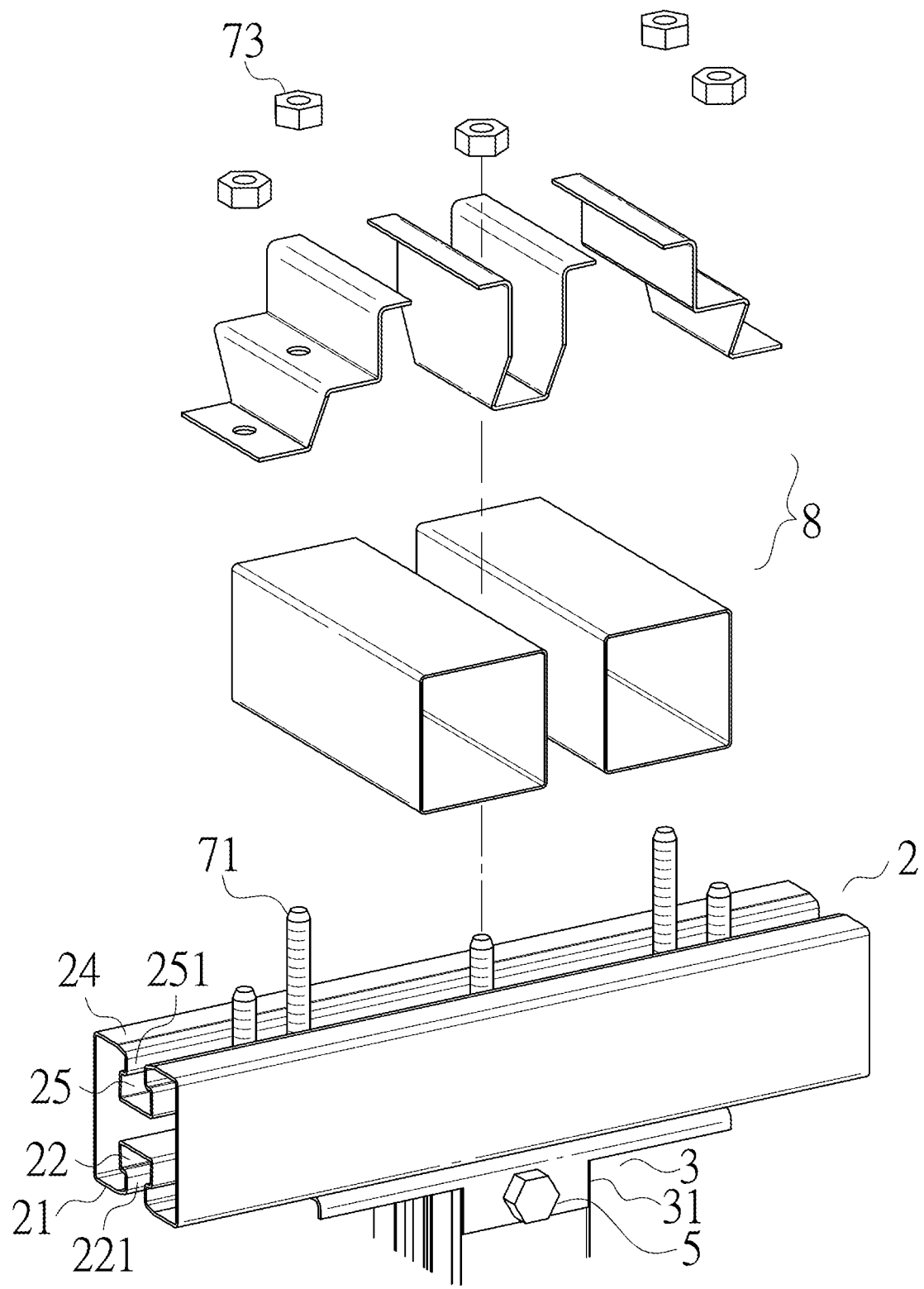
FIG. 3 is a partial, exploded, perspective view of a beam of the support structure of the embodiment according to the present invention and the connecting mechanism.
Figure 4:
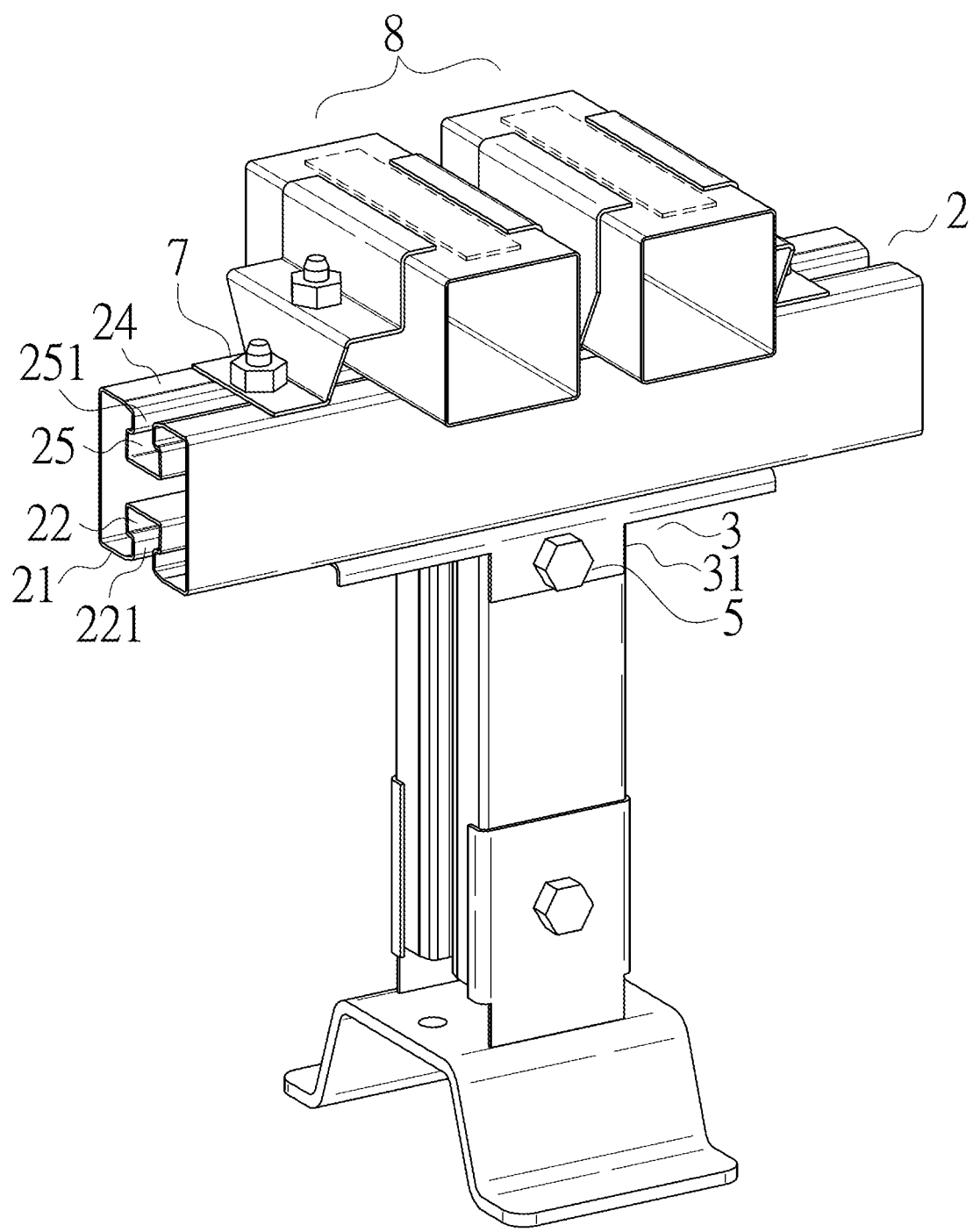
FIG. 4 is a perspective view, illustrating the support structure of the embodiment according to the present invention and the connecting mechanism after assembly.
Figure 5:
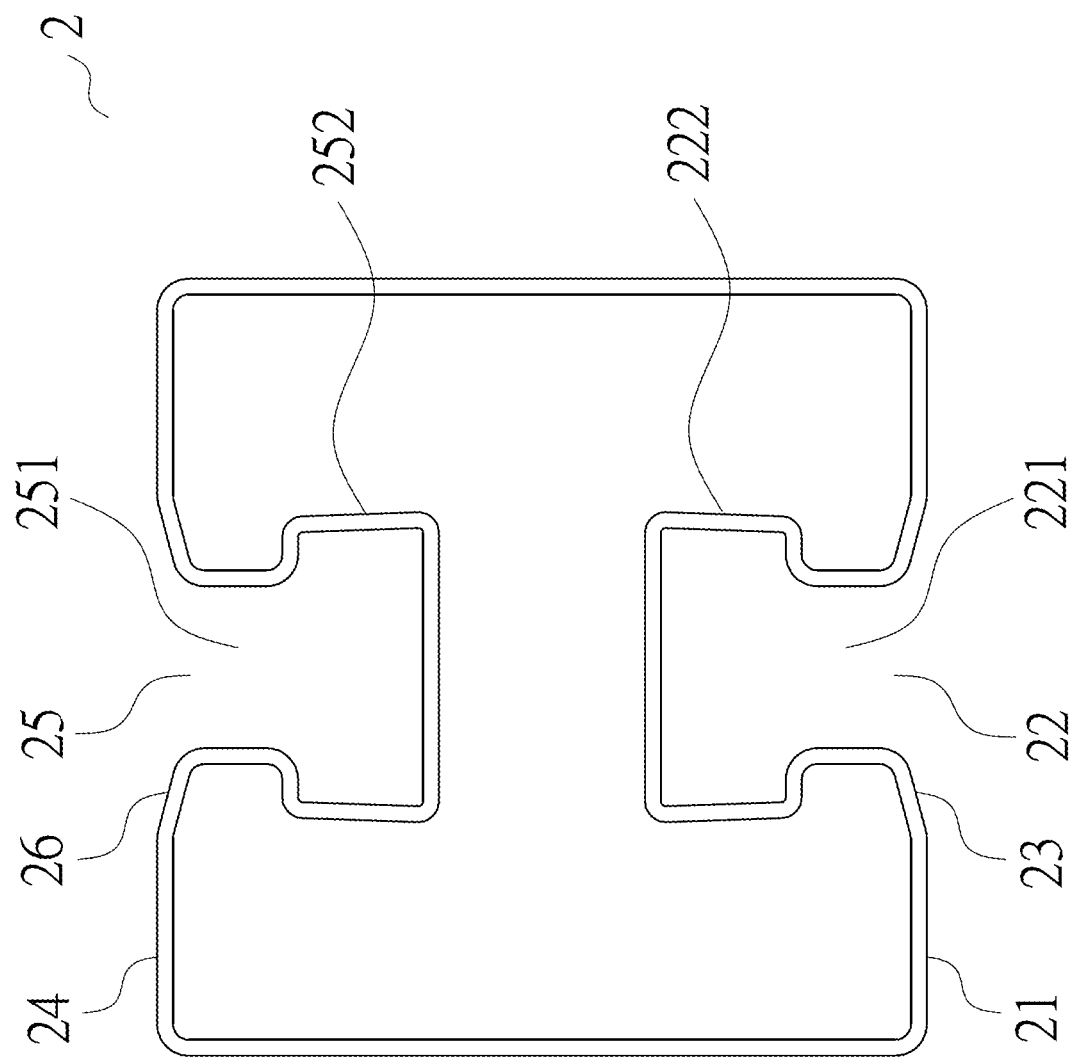
FIG. 5 is a cross sectional view of a beam of the support structure of the embodiment according to the present invention.

With reference to FIGS. 3-5, in the preferred embodiment according to the present invention, the first side 21 is at the bottom, and the second side 24 is at the top. Furthermore, the second side 24 is recessed inwards to form a second rectilinear groove 25 extending in the longitudinal direction of the beam 2. The second rectilinear groove 25 includes a groove opening 251 having two opposite edges. Each of the two opposite edges inclines upwards to form a slant face 26 connected to the second side 24. The second rectilinear groove 25 includes two opposite groove walls 252 which are inclined. A spacing between the two opposite groove walls 252 gradually decreases towards the groove opening 251 of the second rectilinear groove 25. The slant faces 26 and the two opposite groove walls 252 are inclined to provide the beam 2 with a better anti-stretch effect and a high tensile strength, thereby overcoming the drawbacks of deformation and breakage due to insufficient tensile strength. Thus, a connecting mechanism 8 for mounting solar panels (not shown) can be disposed on the top face of the beam 2, achieving the installation of the solar panels.

After experiments of the support structure according to the present invention, given the same material, size, and weight, conventional beam structure deforms under a tensile load of 384 kgf whereas the tensile strength of the beam 2 according to the present invention may be up to 472 kgf. Thus, in comparison with the conventional beam structure, the beam 2 according to the present invention has a better anti-stretch effect. It is worth noting that the beam 2 according to the present invention is formed by extrusion of steel material or aluminum material to form an elongated integral structure. Nevertheless, the manufacture, formation, and size are not limited to this approach and can be adjusted according to different needs.

Although specific embodiments have been illustrated and described, numerous modifications and variations are still possible without departing from the scope of the invention. The scope of the invention is limited by the accompanying claims.

What is claimed is:

1. A support structure for a solar panel, comprising:
   a post;
   a beam disposed above the post, wherein the beam includes a first side recessed inwards to form a first rectilinear groove extending in a longitudinal direction of the beam, wherein the first rectilinear groove includes a groove opening having two opposite edges, wherein each of the two opposite edges inclines downwards to form a slant face connected to the first side, wherein the first rectilinear groove includes two opposite groove walls which are inclined, wherein a spacing between the two opposite groove walls gradually decreases towards the groove opening of the first rectilinear groove, the beam further includes a second side opposite to the first side, wherein the second side is recessed inwards to form a second rectilinear groove extending in the longitudinal direction of the beam, the second rectilinear groove includes a groove opening having two opposite edges, each of the two opposite edges inclines downwards to form a slant face connected to the second side, the second rectilinear groove includes two opposite groove walls which are inclined, and a spacing between the two opposite groove walls gradually decreases towards the groove opening of the second rectilinear groove; and
   a saddle disposed between the post and the beam and straddling a top portion of the post, wherein the saddle includes inverted U-shaped cross sections, wherein two sides of the saddle respectively abut two outer faces of the post and are secured to the post, wherein a top portion of the saddle is secured to the beam by a fastener unit, wherein the fastener unit includes a bolt having a head received in the first rectilinear groove and restrained by the two opposite edges of the groove opening of the first rectilinear groove, and wherein a nut is disposed outside of the groove opening of the first rectilinear groove and is coupled with the bolt.

\* \* \* \* \*